US007528994B2

(12) United States Patent
Hosoya et al.

(10) Patent No.: US 7,528,994 B2
(45) Date of Patent: May 5, 2009

(54) APPARATUS AND METHOD FOR PREPARING PRINTING DATA, COMPUTER PRODUCT, AND PRESCRIPTION PREPARATION APPARATUS

(75) Inventors: Akira Hosoya, Kanagawa (JP); Yuki Kitaoka, 950-10, Minamihasuike-cho, Fukakusa, Fushimi-ku, Kyoto (JP) 612-0036

(73) Assignees: Ricoh Company, Limited, Tokyo (JP); Yuki Kitaoka, Kyoto (JP)

( * ) Notice: Subject to any disclaimer, the term of this patent is extended or adjusted under 35 U.S.C. 154(b) by 1054 days.

(21) Appl. No.: 10/864,460

(22) Filed: Jun. 10, 2004

(65) Prior Publication Data

US 2004/0252347 A1 Dec. 16, 2004

(30) Foreign Application Priority Data

Jun. 13, 2003 (JP) ............................ 2003-169262

(51) Int. Cl.
*H04N 1/40* (2006.01)
*G06F 15/00* (2006.01)

(52) U.S. Cl. ...................................... 358/3.28; 358/1.9

(58) Field of Classification Search ....................... None
See application file for complete search history.

(56) References Cited

U.S. PATENT DOCUMENTS

| | | | | |
|---|---|---|---|---|
| 4,999,654 | A | 3/1991 | Maruo et al. | |
| 5,734,741 | A * | 3/1998 | Kurata et al. | 382/141 |
| 6,115,996 | A * | 9/2000 | Yuyama et al. | 53/411 |
| 2001/0012019 | A1 | 8/2001 | Yamazaki et al. | |
| 2001/0053299 | A1 | 12/2001 | Matsunoshita et al. | |
| 2004/0021311 | A1 * | 2/2004 | Shimada et al. | 283/72 |

FOREIGN PATENT DOCUMENTS

| | | | |
|---|---|---|---|
| EP | 0 610 035 | A2 | 8/1994 |
| EP | 1 302 329 | A2 | 4/2003 |
| JP | 9-194739 | | 7/1997 |
| JP | 2001-223880 | | 8/2001 |
| JP | 2001-238075 | | 8/2001 |
| JP | 2001-314898 | | 11/2001 |
| JP | 2001-346033 | | 12/2001 |
| JP | 2002-314792 | | 10/2002 |
| JP | 2003-110842 | | 4/2003 |

OTHER PUBLICATIONS

U.S. Appl. No. 10/864,460, filed Jun. 10, 2004, Hosoya et al.

* cited by examiner

*Primary Examiner*—Edward L Coles
*Assistant Examiner*—Marcus T Riley
(74) *Attorney, Agent, or Firm*—Oblon, Spivak, McClelland, Maier & Neustadt, P.C.

(57) ABSTRACT

A plurality of ground-tint patterns are prepared. A ground-tint pattern adding unit adds a ground-tint data to a printing data to be output to a printer. The ground-tint data includes a copy-suppression pattern that is prepared by combining optically readable copy-surviving patterns with optically difficult-to-read copy-extinctive pattern and are manifested in reproductions. The ground-tint pattern adding unit changes the copy-suppression pattern in the ground-tint data to be added to the printing data with time.

17 Claims, 12 Drawing Sheets

FIG.10

| NO. | CHARACTER STRING |
|---|---|
| 1 | VOID |
| 2 | COPY PROHIBITED |
| ⋮ | ⋮ |
| n | COPY PROHIBITED |

APPARATUS AND METHOD FOR PREPARING PRINTING DATA, COMPUTER PRODUCT, AND PRESCRIPTION PREPARATION APPARATUS

CROSS-REFERENCE TO RELATED APPLICATIONS

The present document incorporates by reference the entire contents of Japanese priority document, 2003-169262 filed in Japan on Jun. 13, 2003.

BACKGROUND OF THE INVENTION

1) Field of the Invention

The present invention relates to technology for making it easy to identify an original and a duplicate of the original by printing on a paper together with the printing data ground-tint patterns that are not noticeable in the original but are manifested in the duplicate when the original is duplicated.

2) Description of the Related Art

In recent years, a duplicate can be made with high picture quality because of the advance in the copying technique so that the duplicate that is almost same as the original can be obtained. However, on the other hand, there are problems of falsely using duplicates, and a technique that can identify the original from the duplicate has been waited.

As a method for identifying the original from the duplicate, hitherto, special-purpose paper in which ground tints containing seemingly inconspicuous hidden character strings are printed in advance and the hidden character strings are manifested when it is duplicated.

FIG. 13 is an example of ground tint containing hidden character strings. The character portion is formed by ground-tint copy-extinctive patterns and other portion by ground-tint copy-surviving patterns. The ground-tint copy-extinctive patterns are composed of dots smaller than the minimum dots of the reading resolution of a copying machine, while the ground-tint copy-surviving patterns are composed of dots larger than the minimum dot of the reading resolution of the copying machine. Both patterns are set to a similar dot occupation ratio per area, that is, to a similar density, and as a result, the paper has properties difficult to visibly identify the difference even when both patterns are mixed. However, in duplicates, dots of the ground-tint copy-surviving pattern area only are printed and the ground-tint extinctive pattern area is outlined, and as a result, copy suppression character strings by ground-tint copy-extinctive pattern are manifested on duplicates.

Japanese Patent Application Laid-Open Publication No. 2001-238075 proposes that two kinds of dither patterns with varying profiles with same density are used for the back area and the character area, respectively, by the copy prohibition pattern generator, and even when the print result, that is, the original document, is seen, it is impossible to identify the hidden character strings but when the original is optically read by scanner and duplicated by copying machines such as duplicators, etc. which reproduce the original on the form, copy prohibition patterns with hidden character strings formed are generated so that the hidden character strings can be identified.

Japanese Patent Application Laid-Open Publication Nos. H9-164739 and 2001-324989 disclose related arts.

Thus, as a method for identifying the original and the duplicate, the use of special-purpose form with ground-tint patterns already printed can be considered, but the form (paper) cost is high and should the form itself be stolen, there is a possibility that forgery is committed by the use of the form itself, and antitheft measures must be provided, causing problems in usability.

In addition, even when special-purpose form with ground-tint patterns printed is used, in the system of simultaneously printing the printing data and ground-tint pattern data as in the technique disclosed in Japanese Patent Application Laid-Open Publication No. 2001-238075, in recent years, the reading accuracy by scanner has been improved and it has become possible to duplicate the data with ground tint included as it is.

Now, as an example of documents whose original only is effective, there is a directive for prescribing drugs, that is, prescription which is issued by a physician to a patient. In recent years, prescription preparation programs for automatically preparing the prescription by the use of computer have been developed and it has become possible to easily prepare a prescription. That is, when a prescription is prepared, a prescription preparation program is activated, the prescription is prepared by entering the prescription data such as drug and the dose specified by the physician and patient name, etc. and allowing a printer to execute printing. And the prepared prescription has a seal affixed and handed to the patient, and the patient receives the drug specified by the doctor by submitting the prescription to a pharmacy.

In case of the prescription, there are in-hospital prescription addressed to pharmacies inside the hospital facilities and extramural prescription addressed to the pharmacies. In the case of the in-hospital prescription, the physician issues an in-house prescription to the patient and at the same time, the electronic duplicate is issued to the pharmacy inside the hospital facilities, and dispensing is begun without waiting for the arrival of the original in-house prescription of the patient. In the case of the extramural prescription addressed to the pharmacies, the patient him/herself must bring the extramural prescription to a pharmacy and receive the formulated drug. When the extramural prescription is brought, as shown in FIG. 14, there are two cases in which the patient brings the prescription to the pharmacy where the patient generally goes (hereinafter, "always-used pharmacy") and in which the patient brings the prescription to a general pharmacy other than his/her always-used pharmacy as shown in FIG. 15.

In a system in which the patient him/herself brings the extramural prescription to a pharmacy, and the dispensing operation begins after the prescription is received from the patient, a sick patient must be kept waited for a specified time at the pharmacy. Therefore, in order to minimize such waiting time, as in the case of the prescription shown in FIG. 14, it is a common practice to provide services to send the extramural prescription by fax to the always-used pharmacy from the extramural prescription issuing institution on the request of the patient, and enable the pharmacy to begin dispensing without arrival of the original prescription as in the case of the in-house prescription.

However, because legally speaking, the extramural prescription should not be issued for a specific pharmacy, as in the case of FIG. 15, even a pharmacy which is not the always-used pharmacy must dispense the content of the prescription if the patient or the person concerned who is entrusted by the patient brings the extramural prescription to the pharmacy, and the extramural prescription is generally effective for 4 days including the issuing date.

Consequently, while there is extremely little possibility of ill-willed duplication of the prescription by the patient and the person concerned with the patient with respect to the issuance of the in-hospital prescription, in the case of the extramural prescription, no one can deny the possibility for the patient or the person concerned with the patient to prepare duplicates of the original extramural prescription by the use of color copying machine for the purpose of ill-willed acquisition of drugs before bringing the original extramural prescription to a pharmacy, and to submit the duplicates to the pharmacies. In addition, because a pharmacy has a duty to dispense the content of the extramural prescription, the pharmacy may dispense the drug in compliance with the content of the illegal extramural prescription if it is extremely difficult to determine whether the extramural prescription submitted is an ill-willed illegal duplicate or an original. Actually, there are examples of patients who made a plurality of duplicates of extramural prescriptions and attempted to obtain drugs from a plurality of pharmacies.

In the drugs prescribed by medical institutions, there are cases in which drugs whose abuse is legally prohibited, such as narcotics, psychotropic substances, etc. are included, and allowing anyone to illegally acquire such drugs not only poses a high risk but also results in problems that might endanger people's life due to buying and selling of illegally acquired drugs, their abuse, etc. However, preparing prescriptions by the use of special-purpose watermarked forms increases cost, and even when the cost is suppressed by printing the printing data including ground tints on plain paper, if duplicates are purposely prepared, duplication is available with the ground tints included, and it is the current situation that illegal duplicates are let to pass.

SUMMARY OF THE INVENTION

It is an object of the present invention to solve at least the problems in the conventional technology.

A printing data preparation apparatus according to an aspect of the present invention includes a ground-tint pattern adding unit that adds a ground-tint data to a printing data to be output to a printer, wherein the ground-tint data includes a copy-suppression pattern that is prepared by combining optically readable copy-surviving patterns with optically difficult-to-read copy-extinctive pattern and are manifested in reproductions, and the ground-tint pattern adding unit changes the copy-suppression pattern to be added to the ground-tint data with time.

A printing data preparation apparatus according to another aspect of the present invention includes a plurality of printing ports, each printing port including a printer driver unit that converts a printing data into a printer interpretable data to be output to a printer; a ground-tint data storage unit that stores a unique ground-tint data, the ground-tint data includes a copy-suppression pattern that is prepared by combining optically readable copy-surviving patterns with optically difficult-to-read copy-extinctive pattern and are manifested in reproductions; and a ground-tint adding unit that adds the ground-tint data stored in the ground-tint data storage unit to the printer interpretable data output from the printer driver unit; a printing port selecting unit that changes a printing port to input the printing data with time.

A printing data preparation apparatus according to still another aspect of the present invention includes a printer driver unit that converts a printing data into a printer interpretable data to be output to a printer; a memory unit that stores a plurality of unique copy-suppression patterns, each copy-suppression pattern is prepared by combining optically readable copy-surviving patterns with optically difficult-to-read copy-extinctive pattern and are manifested in reproductions; and a ground-tint pattern generating/adding unit that automatically selects a copy-suppression pattern from the copy-suppression patterns stored in the memory unit, generates a ground-tint pattern from the copy-suppression pattern selected, adds the ground-tint pattern generated to the printer interpretable data output from the printer driver, wherein the ground-tint pattern generating/adding unit changes the copy-suppression pattern for generating the ground-tint pattern with time.

A printing data preparation method according to still another aspect of the present invention includes adding to a ground-tint data a copy-suppression pattern that is prepared by combining optically readable copy-surviving patterns with optically difficult-to-read copy-extinctive pattern and are manifested in reproductions, and changing a copy-suppression pattern to be added to the ground-tint data with time; and adding the ground-tint data to a printing data to be output to a printer.

A printing data preparation method according to still another aspect of the present invention is a method of outputting a printing data to a printer with a ground-tint data including copy-suppression patterns which are prepared by combining optically readable copy-surviving patterns with difficult-to-read copy-extinctive pattern and are manifested in reproductions added to the printing data. The method includes preparing a plurality of printing ports, each printing ports storing a unique ground-tint data, converting the printing data into printer interpretable data after adding the unique ground-tint data to the printing data, and outputting the printer interpretable data to the printer; and selecting a printing port to input the printing data based on a predetermined interval.

A printing data preparation method according to still another aspect of the present invention is a method of outputting a printing data to a printer with a ground-tint data including copy-suppression patterns which are prepared by combining optically readable copy-surviving patterns with difficult-to-read copy-extinctive pattern and are manifested in reproductions added to the printing data. The method includes preparing a plurality of copy-suppression pattern data; selecting a copy-suppression pattern from the copy-suppression patterns and when selecting the copy-suppression pattern, changing the copy-suppression pattern based on predetermined interval; generating a ground-tint pattern from the copy-suppression pattern selected; and adding the ground-tint data generated to the printing data and converting the printing data to printer interpretable data.

A computer programs according to still another aspects of the present invention causes a computer to realize the printing data preparation methods according to the present invention.

A computer-readable recording medium according to still another aspect of the present invention stores the computer programs according to the present invention.

A prescription preparation apparatus according to still another aspect of the present invention includes a prescription data preparing apparatus which prepares prescription data for prescriptions on the basis of prescription data of any one of drugs, dose, patient name; a printing data preparation apparatus according to the present invention; and the printer that prints the printing data output from the printing data preparation apparatus.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 10 is an example of contents of a character string table;

DETAILED DESCRIPTION

Exemplary embodiments of the present invention will be described in detail below while referring to the accompanying drawings.

Figure 1:
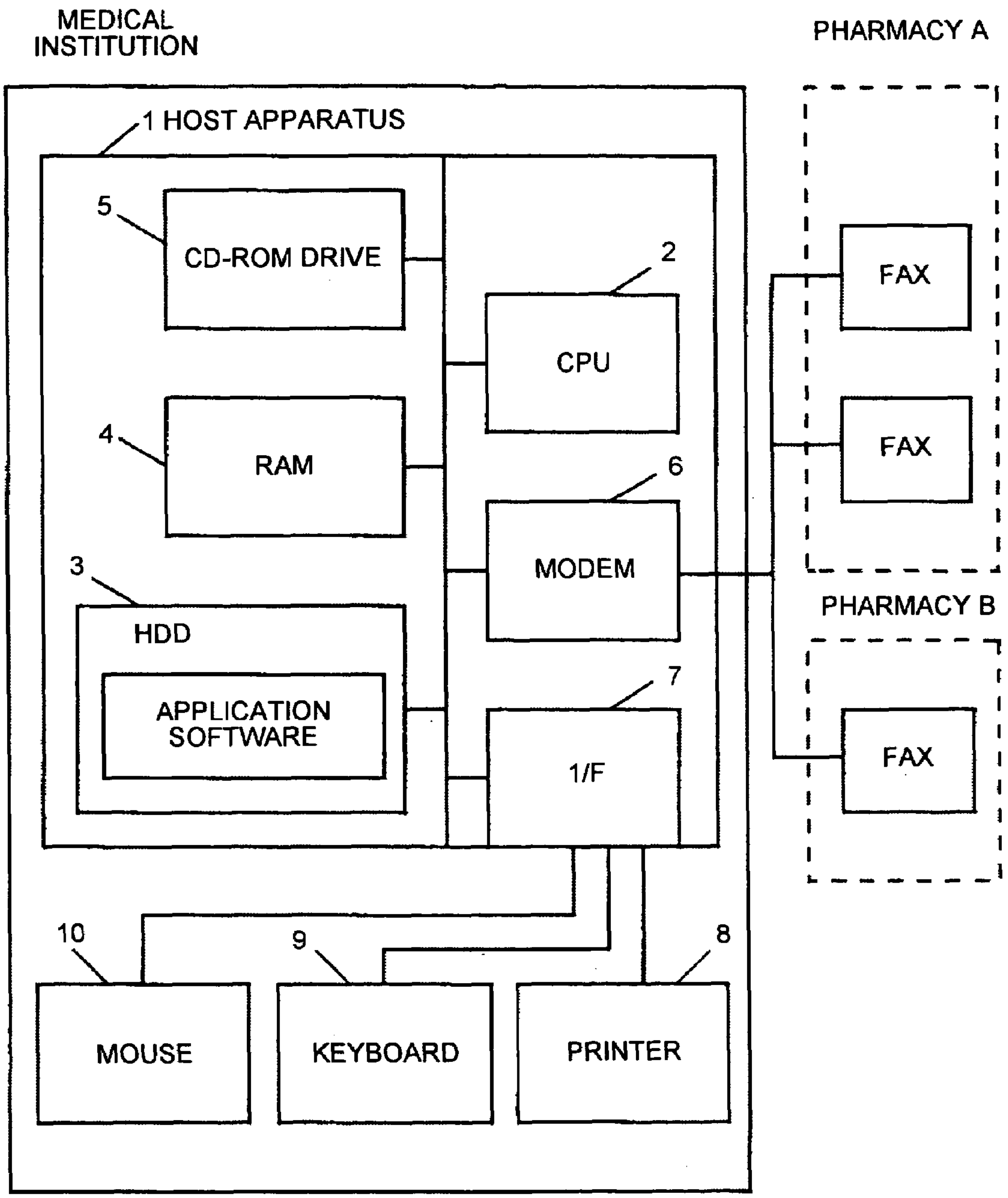
FIG. 1 is a schematic of a prescription network according to an embodiment of the present invention.

FIG. 1 is a schematic of a prescription network according to an embodiment of the present invention. Reference numeral 1 denotes a host apparatus of a medical institution, and to this host apparatus 1, a central processing unit (CPU) 2, a hard disc drive (HDD) 3, a random access memory (RAM) 4, a compact disc (CD-)ROM drive 5, a modem 6, and an interface (I/F) 7 are mounted, and to this I/F 7, a printer 8, a keyboard 9, and mouse 10 are connected.

Various programs for driving and controlling the printer 8, display units, etc. and application software for preparing prescriptions are stored in the HDD 3. These various programs are available through external storage media such as CD-ROM and FD or the Internet. In the case of external storage media, installation programs for installing various programs into the HDD 3 are also stored in memory.

Figure 2:
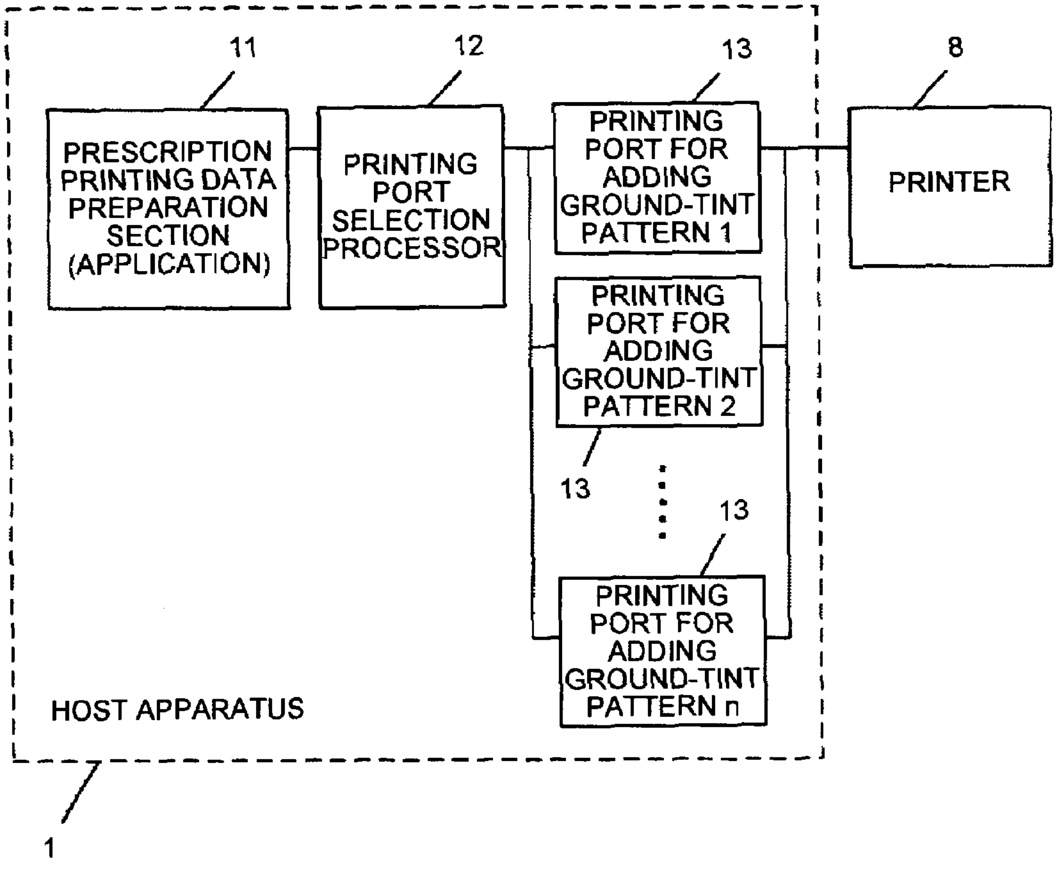
FIG. 2 is a block diagram of a prescription preparation system according to the embodiment.
Figure 3:
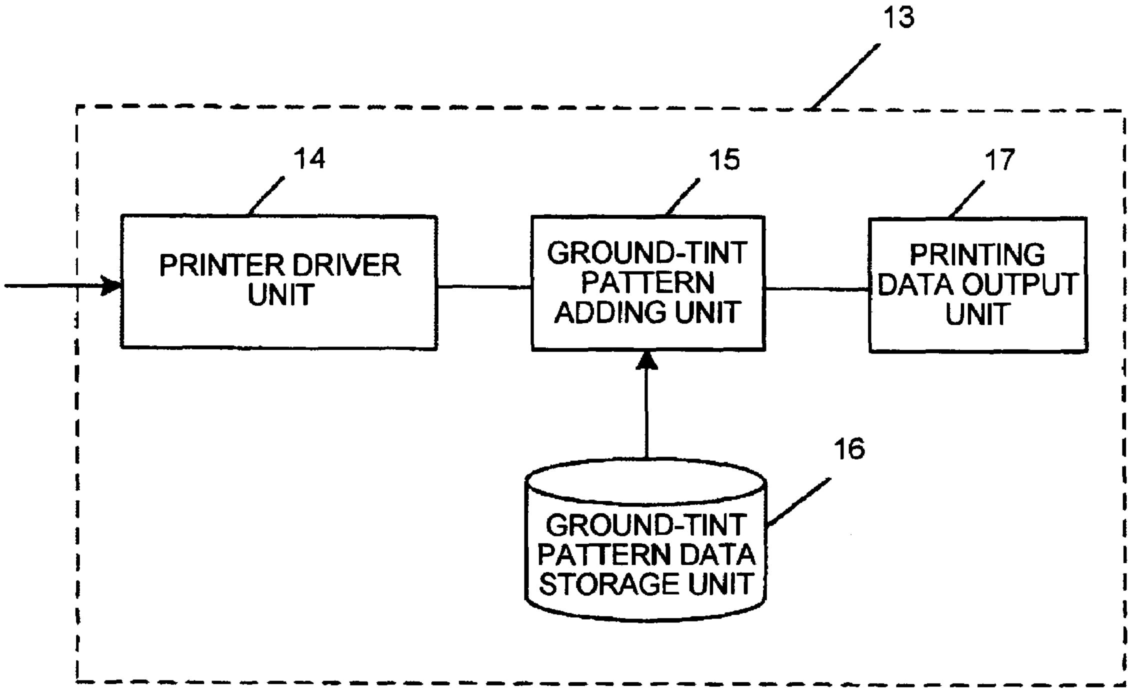
FIG. 3 is a block diagram of a printing port for adding a ground-tint pattern.

FIG. 2 is a block diagram of a prescription preparation system. Reference numeral 11 denotes a prescription printing data preparation unit, 12 denotes a printing port selection processor, and 13 denotes a printing port for adding a ground-tint pattern, and n printing ports for adding a ground-tint pattern are prepared. FIG. 3 is a block diagram of a printing port for adding a ground-tint pattern, and reference numeral 14 denotes a printer driver unit, 15 denotes a ground-tint pattern adding unit, 16 denotes a ground-tint pattern data storage unit for storing ground-tint pattern data in memory, and 17 denotes a printing data output unit, and for the printing ports for adding a ground-tint pattern 13 shown in FIG. 2, ground-tint pattern data stored in the ground-tint pattern data storage unit 16 are different and others are same.

When a prescription is prepared, activating the prescription preparation program enables the host apparatus 1 to carry out a function as a prescription printing data preparation unit 11. In addition, when the prescription printing data preparation unit 11 outputs a printing start command, a program for driving and controlling the printer 8 is activated to enable the host apparatus 1 to function as the printing port selection processor 12, the printer driver unit 14 of the printing port for adding a ground-tint pattern 13, and the ground-tint pattern adding unit 15.

When the prescription preparation program is activated in the host apparatus 1 to input the prescription data and a printing execution command is output from the host apparatus 1, one printing port for adding a ground-tint pattern is automatically selected from the n printing ports for adding a ground-tint pattern 13 by the printing port selection processor 12. After the printing port for adding a ground-tint pattern 13 is decided, the prescription printing data is output from the printing port selection processor 12 to the printing port for adding a ground-tint pattern 13.

Figure 4:
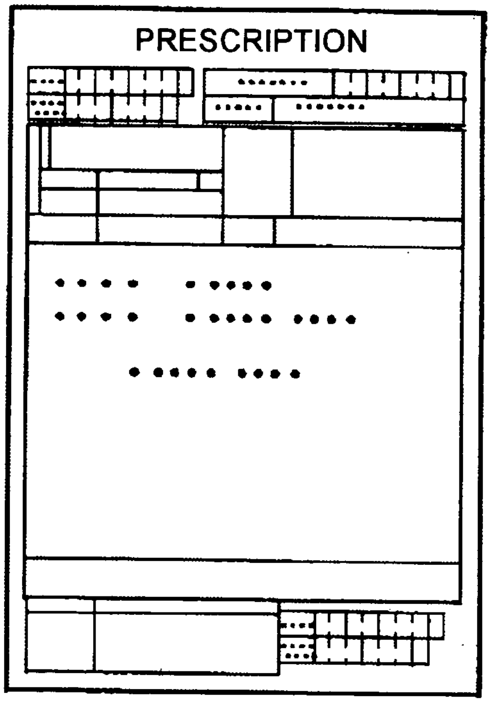
FIG. 4 is an example of a prescription.

In the printing port for adding a ground-tint pattern 13, first of all, in the printer driver unit 14, the data sent from the prescription printing data preparation unit 11 is translated into the interpretable data and output at the printer 8. If this data is output by a printer, as shown in FIG. 4, a prescription format and data are recorded in a blank form.

Figure 5:
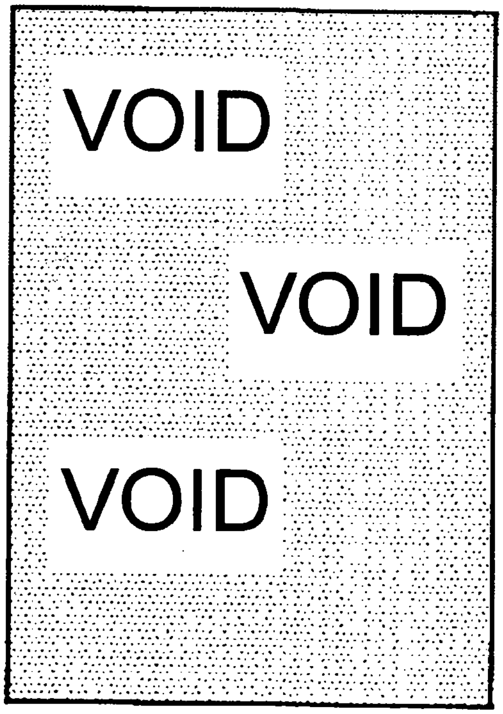
FIG. 5 is an example of a ground-tint pattern containing printing suppressing characters.
Figure 6:
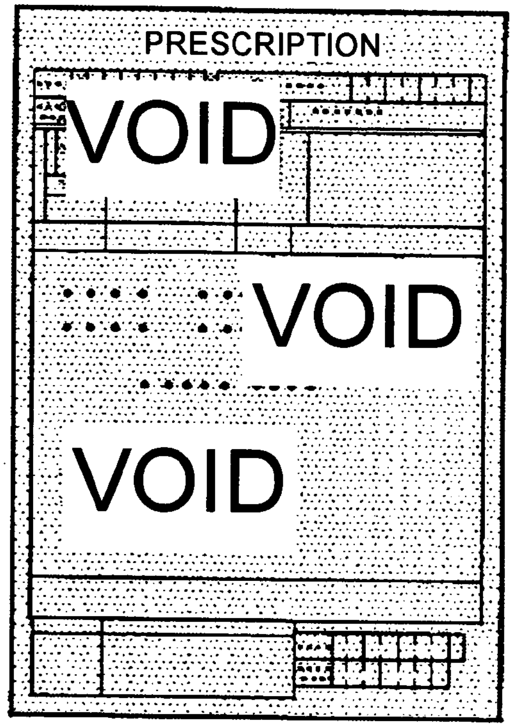
FIG. 6 is an example of a prescription with a ground tint containing printing suppressing characters for the background.
Figure 7:
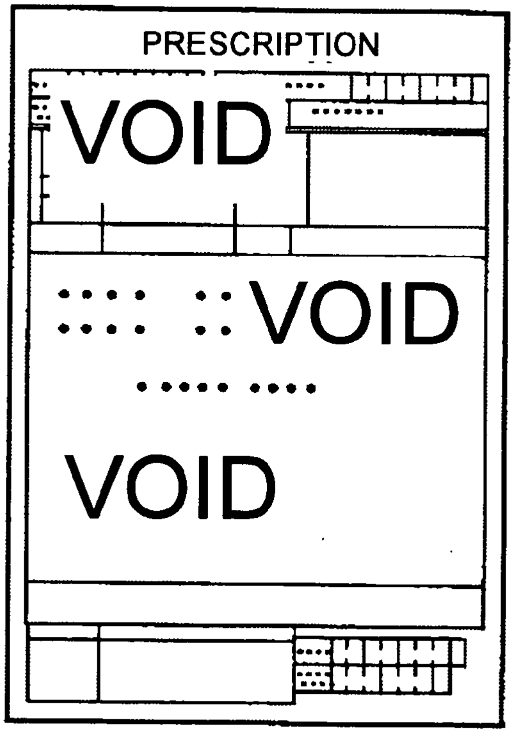
FIG. 7 is a copy of the prescription shown in FIG. 6.

To the data output from the printer driver unit 14, the ground-tint pattern adding unit 15 adds the ground-tint pattern data stored in the ground-tint pattern data storage unit 16, and outputs to the printer 8 via the printing data output unit 17. As a result, from the printer 8, the prescription printing data shown in FIG. 4 and the ground tint printing data as shown in FIG. 5 are synthesized and the prescription is output by printing with the ground tint containing the printing suppression characters for the background as shown in FIG. 6. When the prescription. shown in FIG. 6 is duplicated, as shown in FIG. 7, the copy-extinctive patterns in the ground-tint patterns are deleted and copy-surviving patterns are recorded, and the copy suppression character strings of VOID are manifested.

Figure 8:
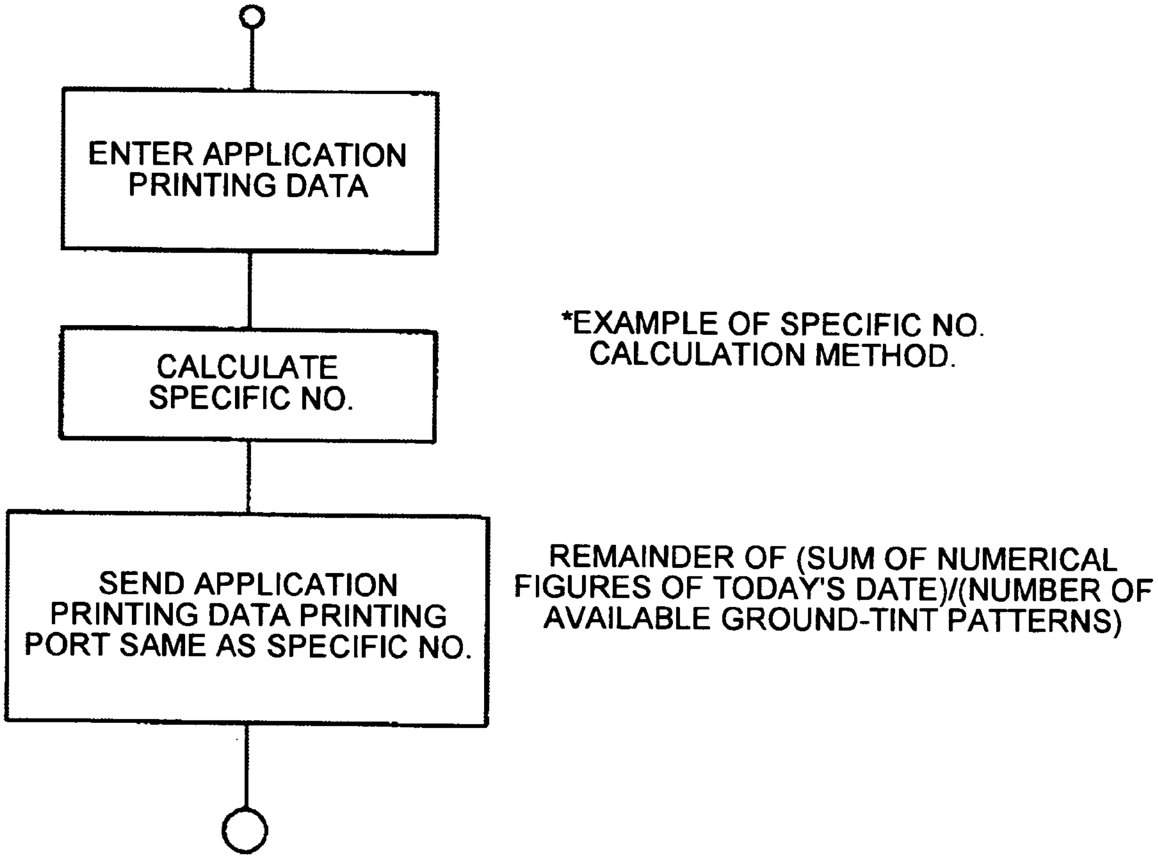
FIG. 8 is an example of a method for determining a printing port for adding ground-tint patterns.

FIG. 8 is an example of a method for determining a printing port for adding ground-tint patterns. To begin with, the specific number deduced by a function with the date used as a reference is calculated and the value for each day is decided, and the printing port for adding a ground-tint pattern 13 corresponding to the value is thereby automatically selected, and the preparation data from the prescription printing data preparation unit 11 is sent to the selected printing port for adding a ground-tint pattern 13. And the ground-tint pattern that corresponds to the printing port for adding a ground-tint pattern 13 is decided and added to the prescription printing data, and output to the printer 8.

For the function with the date used as a reference, by designating the remainder obtained by dividing, for example, a sum of numerical figures of the today's date by the number of available patterns (n in the present case) as the specific number, for example, if n is 7, the data of the ground-tint patterns that correspond to days of a week is added to the prescription printing data.

Now, when the data is output from the host apparatus 1 to the printer 8, the prescription printing data and the data of ground-tint patterns may be combined into one image data on the host apparatus 1 side and output to the printer 8, or the basic data such as drug names, doses, etc., prescription format data, and furthermore the ground-tint pattern data may be output to the printer 8, respectively and separately, so that they may be integrated into one image data at the printer 8. By the way, when the prescription is transmitted from the host apparatus 1 to the always-used pharmacy by fax, the former is advantageous.

In the ground-tint pattern shown in FIG. 5, for the area other than the printing suppression characters, for example, a ground tint copy-extinctive pattern is formed by placing colors with the specified spaces provided in increments of 1 dot of 600 dpi and the area of the printing suppression character forms 1 dot larger than the 1 dot of 600 dpi, and by placing colors with the specified space provided in increments of the 1 dot, the ground tint copy-surviving pattern is formed. Now, the dot intervals or dot occupation ratio is set in such a manner that the density of the ground tint copy-surviving pattern area is included in the area within ±1% of the density of the ground tint copy-extinctive pattern area. Consequently, in the prescription shown in FIG. 6, the VOID printing suppression characters are not noticeable at a glance, but when it is carefully watched, the printing suppression characters can be identified because the printing suppression character area has the dot intervals greater than the area other than the printing suppression characters.

When the prescription shown in FIG. 6 in which such a ground tint is printed is duplicated by the use of a copying machine which is not capable for reading 1 dot of 600 dpi, characters of VOID are manifested as shown in FIG. 7, and even in a pharmacy, which is not the always-used pharmacy, it is possible to easily determine whether the prescription is the original or the duplicate.

In addition, according to the present embodiment, since a one-to-one correspondence is achieved between the date of issuing the prescription and the ground-tint pattern, for example, even if an illegal prescription is issued with the date of issuance of the prescription changed making the best of the image processing techniques, it becomes possible to determine whether or not the prescription is falsified by carefully watching the ground-tint patterns and examining the printing suppression characters. In such case, if the pharmacy is the patient's always-used pharmacy, the ground-tint pattern can be easily obtained from the medical institution and the pharmacy can confirm the pattern, but if it a pharmacy other than the always-used pharmacy, it is not easy to determine whether or not the prescription is falsified by looking the prescription. Therefore, it is desirable to set forth a direction in the prescription to encourage the pharmacy to communicate with the prescription issuing source, medical institution so that even a general pharmacy can obtain the ground-tint pattern.

By the way, regarding the number n of the printing port for adding a ground-tint pattern 13, it is better to have larger number of ports because it is advantageous to have a larger number of ground-tint patterns. In addition, needless to say, it is effective for measures against illegal copies to have shorter timing to change over the printing port for adding a ground-tint pattern 13. Because in the example mentioned above, the effective period of the prescription is four days and the ground-tint patterns are updated-every other day, it is desirable to have five or more ports. In addition, in the ground-tint patterns of the selected printing port for adding a ground-tint pattern 13, it becomes possible to increase variations of ground-tint patterns by updating the storage content of the ground-tint pattern data storage unit 16 in such a manner that the positions and gradients of printing suppression characters are varied by, for example, rotating the printing suppression characters or moving them vertically or horizontally. Furthermore, in the area other than the area of printing suppression characters, functions are provided to change the dot intervals and pattern this change, and to vary this pattern every day.

Figure 9:
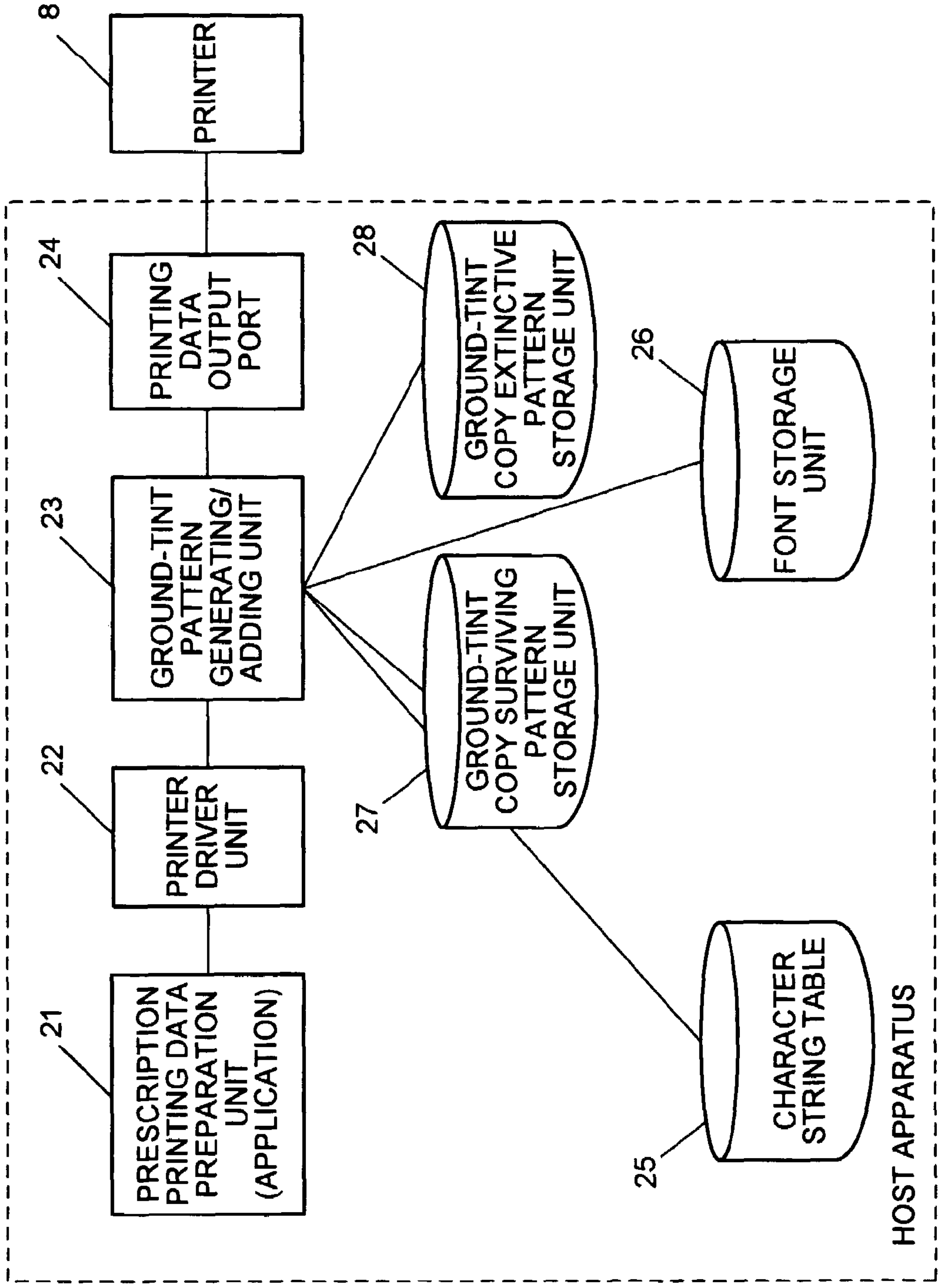
FIG. 9 is schematic of a prescription printing system according to another embodiment of the present invention.

FIG. 9 is schematic of a prescription printing system according to another embodiment of the present invention. Reference numeral 21 denotes a prescription printing data preparation unit, 22 denotes a printer driver unit, 23 denotes a ground-tint pattern generating/adding unit, 24 denotes a printing data output port, 25 denotes a character string table, 26 denotes a font storage unit, 27 denotes a ground-tint copy-surviving pattern storage unit, and 28 denotes a ground-tint copy-extinctive pattern storage unit.

When a prescription is prepared, activating the prescription preparation program enables the host apparatus 1 to carry out a function as the prescription printing data preparation unit 21. In addition, when the prescription printing data preparation unit 21 outputs the printing start command, activating the program to drive and control the printer 8 enables the host apparatus 1 to carry out a function as the printer driver unit 22 and ground-tint pattern generating/adding unit 23.

When the prescription preparation program is activated in the host apparatus 1 and the prescription data is entered to output the printing execution command to the printer driver unit 22, the prescription printing data is translated into the interpretable data in the printer 8 and output from the printer driver unit 22. To this data, in the ground-tint pattern generating/adding unit 23, the ground-tint pattern data is prepared on the basis of the data stored in the character string table 25, the font storage unit 26, the ground-tint copy-surviving pattern storage unit 27, and the ground-tint copy-extinctive pattern storage unit 28, the ground-tint pattern data is added to the printing data from the printer driver unit 22 and output to the printer 8 via printing data output port 24. As a result, the prescription is output from the printer 8.

Figure 11:
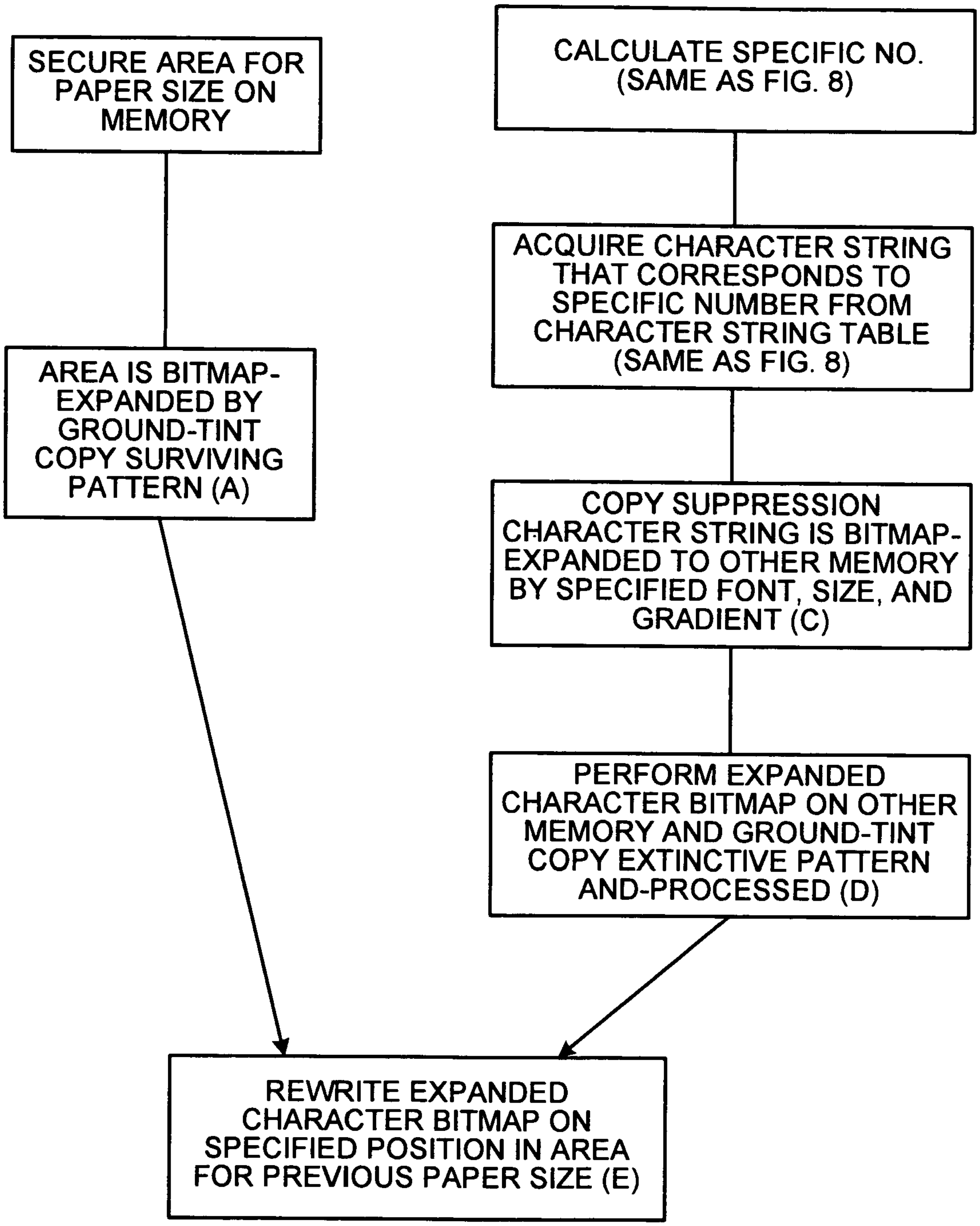
FIG. 11 is a flowchart of a ground-tint pattern generating process.
Figure 12:
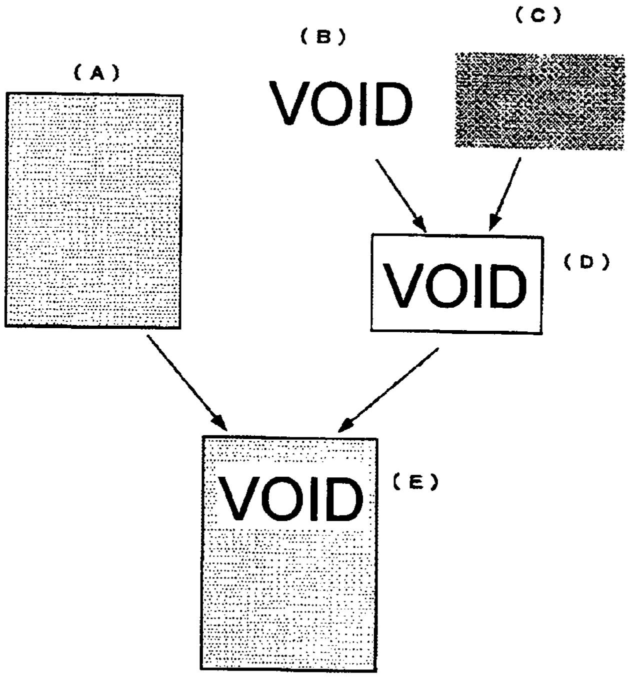
FIG. 12 is to explain data expansion on memory in the process shown in FIG. 11.
Figure 13:
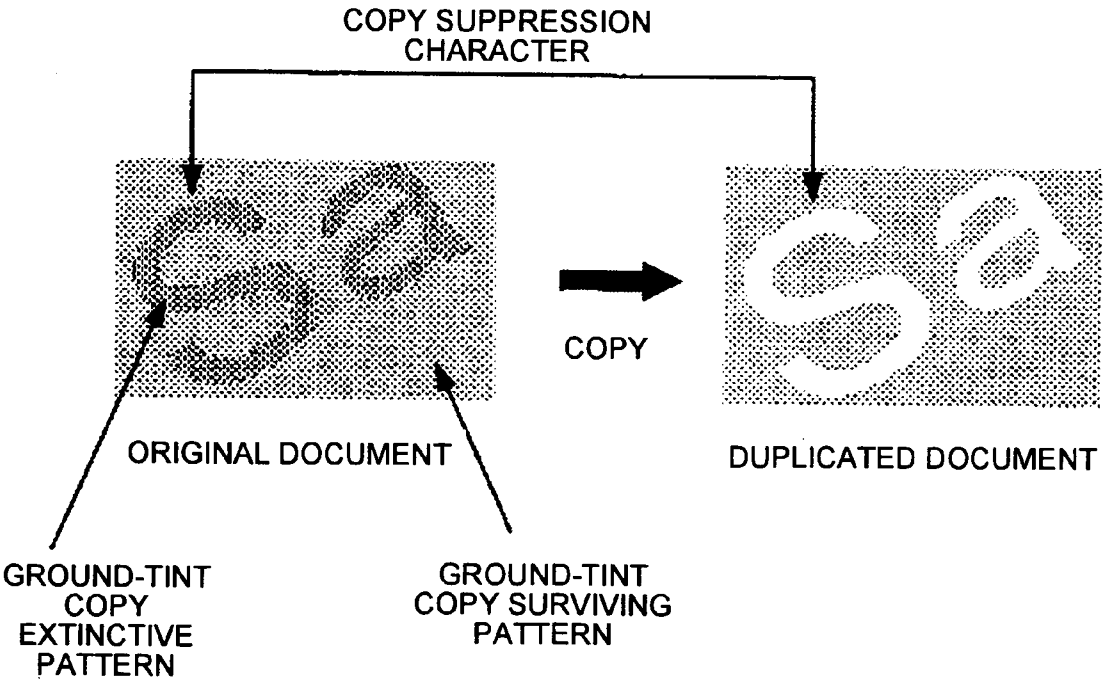
FIG. 13 is an example of ground tint containing hidden character strings.
Figure 14:
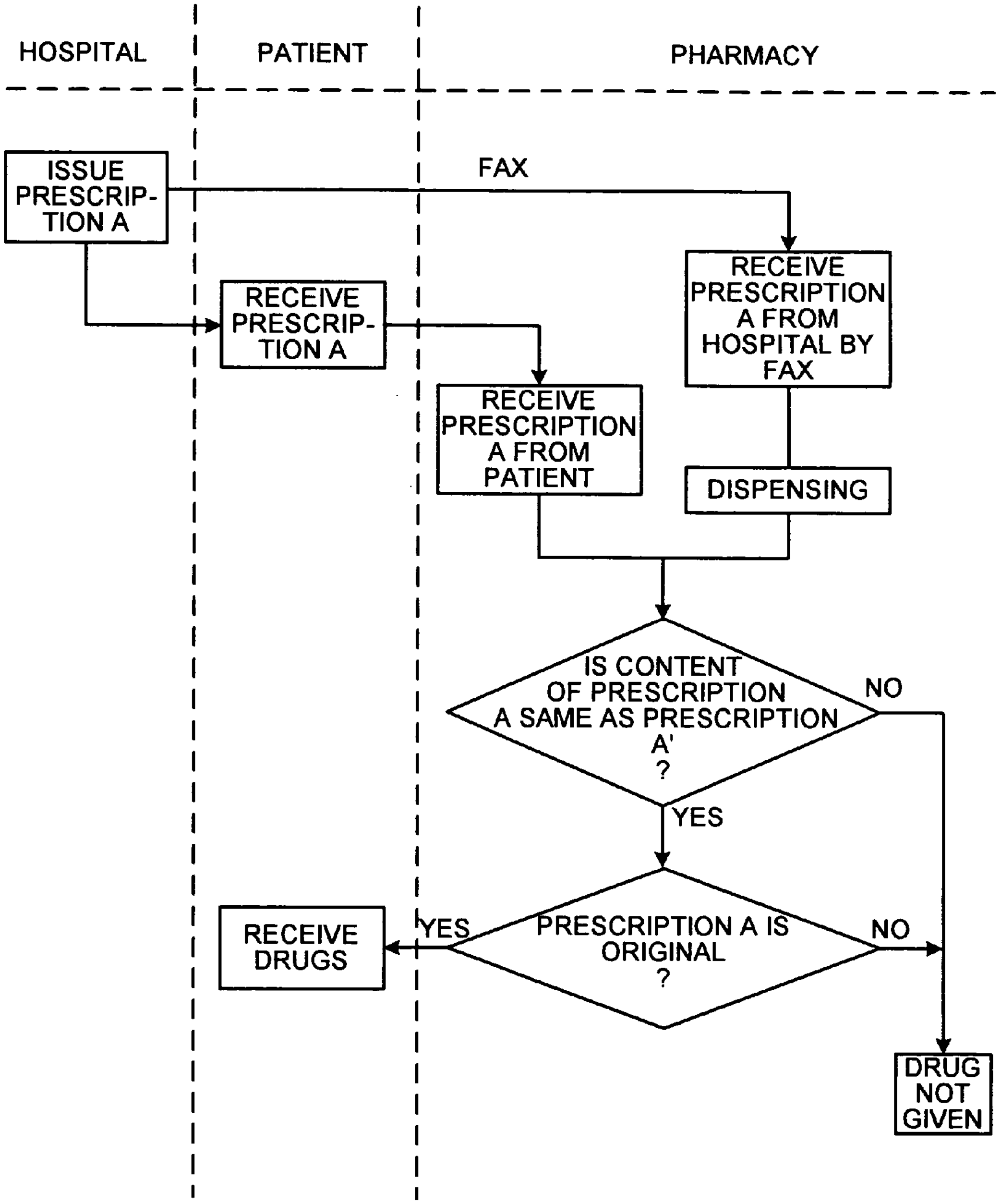
FIG. 14 is a flowchart of a process when a person brings the prescription to his/her always-used pharmacy and receive drugs.
Figure 15:
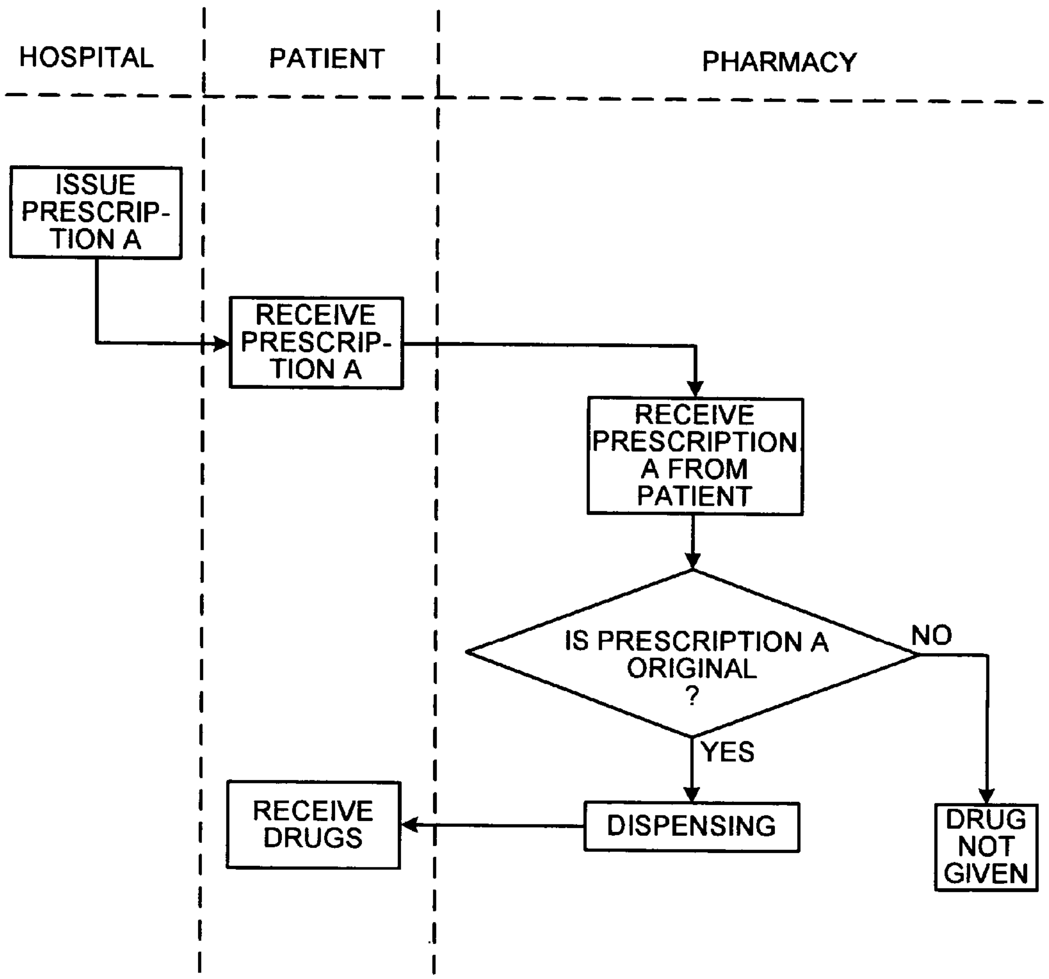
FIG. 15 is an illustration describing a process for a person to bring the prescription to a general pharmacist and receive drugs.

FIG. 10 is an illustration indicating an example of character string table, and n pieces of character data which form printing suppression characters are stored in correspondence with the number. FIG. 11 is a flowchart of the ground-tint pattern generating process, and FIG. 12 is to explain data expansion on memory in the process shown in FIG. 11. To begin with, an area for the form size is secured on the memory (RAM 4), and in this area, the ground-tint copy-extinctive pattern stored in the ground-tint copy-surviving pattern storage unit 27 is bitmap-expanded as shown in (A) of FIG. 12. In parallel with this, the copy suppression character is prepared. First of all, for example, as described above, the remainder when the sum of numerical figures of the today's date is divided by the number of available patterns (n in this case) is calculated, and the value that achieves a one-to-one correspondence with this remainder value is designated as the specific number. Then, the character string which becomes the copy suppression character that corresponds to this specific number is acquired from the character string table 25. For example, in the table shown in FIG. 10, when the remainder is "0" "VOID" of specific No. 1 is acquired, and when the remainder is "1" "COPY PROHIBITED" of specific No. 2 is obtained. Then, the acquired character strings are expanded as shown in (B) of FIG. 12 in an area different from the area where the above-mentioned ground-tint copy extinct pattern is expanded as the bitmap data in the specified font, size, and gradient. Furthermore, in an area different from the area in which the character string which becomes the copy suppression character is expanded, the ground-tint copy-surviving pattern is bitmap-expanded as shown in (C) of FIG. 12. And by AND-processing the bitmap data of the character string which becomes the copy suppression character and bitmap data of ground-tint copy-surviving pattern, the copy suppression character as shown in (D) of FIG. 12 is generated. By rewriting the bitmap data of the copy suppression character prepared in this way on the specified position of the area in which the ground-tint copy-surviving pattern is expanded, the ground-tint pattern as shown in (E) of FIG. 12 is prepared. If a duplicate of the ground-tint pattern as shown in (E) of FIG. 12 is prepared, characters of VOID are manifested on a white background.

Conversely, when the copy suppression character is prepared by the ground-tint copy-extinctive pattern and written on the ground-tint copy-surviving pattern, outline characters of VOID are manifested.

Now, in this embodiment, it is possible to set detailed printing in the prescription preparation program, and in the printing setting menu, an item to select whether or not ground-tint printing is carried out is provided. When the ground-tint printing is carried out, either automatic mode to automatically prepare and add a ground-tint pattern or a manual mode to manually designate a ground-tint pattern and add is selected. In the case of the manual mode, the printing result with the ground-tint pattern can be obtained by entering the item for entering the character string which becomes the copy suppression character, the item to designate the font and the size, and the item to designate the position on the form. In the case of the automatic mode, a character string table as shown in FIG. 10 is prepared in advance, and by specifying the timing for automatically changing over the character string that becomes the copy suppression character, for example, a numerical expression shown in FIG. 8, ground-tint patterns with copy suppression characters varied in accordance with the specified timing are prepared, and as a result, the ground-tint pattern is updated. For example, in the processing shown in FIG. 8, the printing results in which the ground-tint pattern is changed over every other day can be obtained.

By the way, in setting the automatic mode, by providing elements such as position on the form, rotating angle of character strings, selection of ground tint copy-surviving patterns or extinctive patterns for the background, and others in addition to the printing suppression character strings, it is possible to increase variations of ground-tint patterns. In such event, because initial setting becomes a troublesome work, an initial setting program may be prepared to organize the elements that constitute the automatic change-over conditions in advance and store in memory.

Embodiments of the present invention have been described above, but the present invention shall not be limited to these embodiments, and in the above-mentioned embodiments, the invention is described with prescription printing taken for an example, but for example, application software for preparing other documents may be used.

According to the present invention configured as described above, copy-suppression patterns are automatically changed over at regular periods when an original printed matter is prepared, and because the copy-suppression patterns are not changed in duplicates or falsified documents prepared by using the original before the copy-suppression pattern is changed over, it becomes possible to determine whether or not the printed matter is original by comparing the copy-suppression pattern when the original is prepared with the copy-suppression pattern of the printed matter. As a result, for example, by providing the information on the ground-tint patterns to a pharmacy, it is possible to prevent drugs from being handed to a patient who brings a duplicated or falsified illegal prescription.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A printing data preparation apparatus comprising:

a plurality of printing ports, each printing port including:

a printer driver unit that converts printing data into printer interpretable data to be output to a printer, a ground-tint data storage unit that stores unique ground-tint data, the ground-tint data includes a copy-suppression pattern that is prepared by combining an optically readable copy-surviving pattern with an optically difficult-to-read copy-extinctive pattern and are manifested in reproductions, and a ground-tint adding unit that adds the ground-tint data stored in the ground-tint data storage unit to the printer interpretable data output from the printer driver unit;

a printing port selecting unit that changes a printing port to input the printing data with time; and a specific number calculating unit that calculates a specific number using date and a predetermined function, wherein the printing port selecting unit changes the printing ports based on the number calculated by the specific number calculating unit.

2. The printing data preparation apparatus according to claim 1, wherein the specific number calculating unit takes a remainder of (a total of numerical figures of current date)/(number of available patterns) as the specific number.

3. The printing data preparation apparatus according to claim 1, wherein the copy-surviving pattern is printed by dots of a size that is optically readable and the copy-extinctive pattern is printed by dots of a size that is not optically readable.

4. The printing data preparation apparatus according to claim 3, wherein the dot occupation ratio per area of the copy-surviving pattern to the copy-extinctive pattern is made similar to each other and density of the copy-surviving pattern is kept within ±1% of that of the copy-extinctive pattern.

5. The printing data preparation apparatus according to claim 1, wherein a printing position of the copy-suppression pattern is varied at a predetermined interval.

6. A printing data preparation apparatus comprising:

a printer driver unit that converts a printing data into a printer interpretable data to be output to a printer;

a memory unit that stores a plurality of unique copy-suppression patterns, each copy-suppression pattern is prepared by combining an optically readable copy-surviving pattern with an optically difficult-to-read copy-extinctive pattern, manifested in reproductions; and a ground-tint pattern generating/adding unit that automatically selects a copy-suppression pattern from the copy-suppression patterns stored in the memory unit, generates a ground-tint pattern from the copy-suppression pattern selected, and adds the ground-tint pattern generated to the printer interpretable data output from the printer driver, the ground-tint pattern generating/adding unit including:

a storage unit which data expands the copy-suppression pattern selected, an AND-processor that AND-processes the data expanded and either of the copy-surviving pattern or the copy-extinctive pattern, and a writing unit that writes the copy-suppression pattern data patterned by AND processor to either of the copy-surviving pattern or the copy-extinctive pattern on a predetermined position in an other pattern that has been previously expanded in a memory area of a size of a form, wherein the ground-tint pattern generating/adding unit changes the copy-suppression pattern for generating the ground-tint pattern with time.

7. The printing data preparation apparatus according to claim 6, further comprising a specific number calculating unit that allocates a number to each of the copy-suppression patterns stored in the memory unit and calculates a specific number using date and a predetermined function, wherein the ground-tint pattern generating/adding unit selects the ground-tint data that corresponds to the specific number calculated by the specific number calculating unit as the ground-tint pattern for generating the ground-tint pattern.

8. The printing data preparation apparatus according to claim 7, wherein the specific number calculating unit takes a remainder of (a total of numerical figures of current date)/(number of available patterns) as the specific number.

9. The printing data preparation apparatus according to claim 6, wherein the copy-surviving pattern is printed by dots of a size that is optically readable and the copy-extinctive pattern is printed by dots of a size that is not optically readable.

10. The printing data preparation apparatus according to claim 9, wherein the dot occupation ratio per area of the copy-surviving pattern to the copy-extinctive pattern is made similar to each other and density of the copy-surviving pattern is kept within ±1% of that of the copy-extinctive pattern.

11. The printing data preparation apparatus according to claim 6, wherein a printing position of the copy-suppression pattern is varied at a predetermined interval.

12. A printing data preparation method of outputting to a printer printing data with ground-tint data including copy-suppression patterns which are prepared by combining an optically readable copy-surviving pattern with an optically difficult-to-read copy-extinctive pattern and are manifested in reproductions to add to the printing data, the method comprising:

preparing a plurality of printing ports, each printing port storing unique ground-tint data, converting the printing data into printer interpretable data after adding the unique ground-tint data to the printing data, and outputting the printer interpretable data to the printer;

selecting a printing port to input the printing data based on a predetermined interval; and calculating a specific number using a data and a predetermined function, wherein selecting one of the printing ports is based on the calculated number.

13. A printing data preparation method of outputting to a printer printing data with ground-tint data including copy-suppression patterns which are prepared by combining an optically readable copy-surviving pattern with an optically difficult-to-read copy-extinctive pattern and are manifested in reproductions to add to the printing data, the method comprising:

preparing data on a plurality of copy-suppression patterns;

selecting a copy-suppression pattern from the copy-suppression patterns and when selecting the copy-suppression pattern, changing the copy-suppression pattern based on predetermined interval;

generating a ground-tint pattern from the copy-suppression pattern selected;

adding the ground-tint data generated to the printing data and converting the printing data to printer interpretable data;

data-expanding the copy-suppression pattern selected;

AND-processing the data expanded and either of the copy-surviving pattern and the copy-extinctive pattern; and writing the copy-suppression pattern data patterned to either of the copy-surviving pattern and the copy-extinctive pattern on a predetermined position in the other pattern that has been previously expanded in a memory area of a size of a form.

14. A computer-readable recording medium that stores a computer program that causes a computer to realize a printing data preparation method of outputting to a printer printing data with ground-tint data including copy-suppression patterns which are prepared by combining an optically readable copy-surviving pattern with an optically difficult-to-read copy-extinctive pattern and are manifested in reproductions to add to the printing data, the computer program causing the computer to execute:

preparing a plurality of printing ports, each printing port storing unique ground-tint data, converting the printing data into printer interpretable data after adding the unique ground-tint data to the printing data, and outputting the printer interpretable data to the printer;

selecting a printing port to input the printing data based on a predetermined interval; and calculating a specific number using a data and a predetermined function, wherein selecting one of the printing ports is based on the calculated number.

15. A computer-readable recording medium that stores a computer program that causes a computer to realize a printing data preparation method of outputting printing data to a printer with ground-tint data including copy-suppression patterns which are prepared by combining an optically readable copy-surviving patterns with an optically difficult-to-read copy-extinctive pattern and are manifested in reproductions to add to the printing data, the computer program causing the computer to execute:

preparing data on a plurality of copy-suppression patterns;

selecting a copy-suppression pattern from the copy-suppression patterns and when selecting the copy-suppression pattern, changing the copy-suppression pattern based on a predetermined interval;

generating a ground-tint pattern from the copy-suppression pattern selected;

adding the ground-tint data generated to the printing data and converting the printing data to printer interpretable data;

data-expanding the copy-suppression pattern selected;

AND-processing the data expanded and either of the copy-surviving pattern and the copy-extinctive pattern; and writing the copy-suppression pattern data patterned to either of the copy-surviving pattern and the copy-extinctive pattern on a predetermined position in the other pattern that has been previously expanded in a memory area of a size of a form.

16. A prescription preparation apparatus comprising:

a prescription data preparing apparatus which prepares prescription data for prescriptions on the basis of prescription data of any one of drugs, dose, and patient name;

a printing data preparation apparatus that receives the prescription data prepared by the prescription data preparation apparatus as printing data, the printing data preparation apparatus including:

a plurality of printing ports, each printing port including:

a printer driver unit that converts the printing data into printer interpretable data to be output to a printer, a ground-tint data storage unit that stores unique ground-tint data, the ground-tint data includes a copy-suppression pattern that is prepared by combining an optically readable copy-surviving pattern with an optically difficult-to-read copy-extinctive pattern and are manifested in reproductions, a ground-tint adding unit that adds the ground-tint data stored in the ground-tint data storage unit to the printer interpretable data output from the printer driver unit, a printing port selecting unit that changes a printing port to input the printing data with time, and a specific number calculating unit that calculates a specific number using a date and a predetermined function, wherein the printing port selecting unit selects one of the printing ports based on the number calculated by the specific number calculating unit; and a printer that prints the printing data output from the printing data preparation apparatus.

17. A prescription preparation apparatus comprising:

a prescription data preparing apparatus which prepares prescription data for prescriptions on the basis of prescription data of any one of drugs, dose, and patient name;

a printing data preparation apparatus that receives the prescription data prepared by the prescription data preparing apparatus as printing data, the printing data preparation apparatus includes:

a printer driver unit that converts the printing data into printer interpretable data to be output to a printer, a memory unit that stores a plurality of unique copy-suppression patterns, each copy-suppression pattern is prepared by combining an optically readable copy-surviving pattern with an optically difficult-to-read copy-extinctive pattern and are manifested in reproductions, and a ground-tint pattern generating/adding unit that automatically selects a copy-suppression pattern from the copy-suppression patterns stored in the memory unit, generates a ground-tint pattern from the copy-suppression pattern selected, adds the ground-tint pattern generated to the printer interpretable data output from the printer driver, the ground-tint pattern generating/adding unit including:

a storage unit which data-expands the copy-suppression pattern selected, an AND-processor that AND-processes the data expanded and either of the copy-surviving pattern and the copy-extinctive pattern, and a writing unit that writes the copy-suppression pattern data patterned by the AND processor to either of the copy-surviving pattern and the copy-extinctive pattern on a predetermined position in the other pattern that has been previously expanded in a memory area of a size of a form, wherein the ground-tint pattern generating/adding unit changes the copy-suppression pattern for generating the ground-tint pattern with time; and a printer that prints the printing data output from the printing data preparation apparatus.

* * * * *